Nov. 17, 1936. J. J. TAYLOR 2,061,371
CLAMP
Filed Sept. 6, 1935
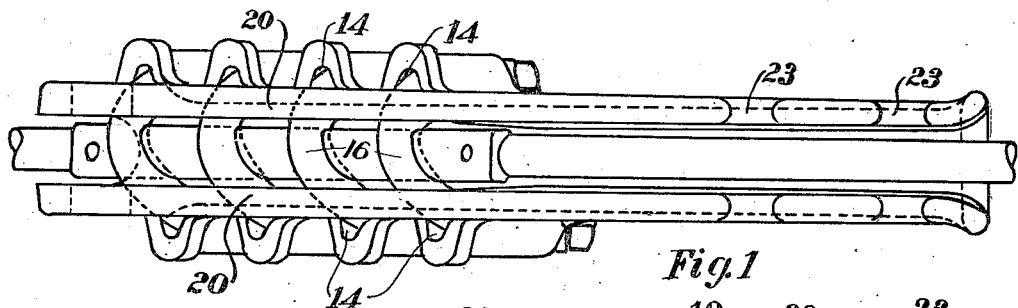
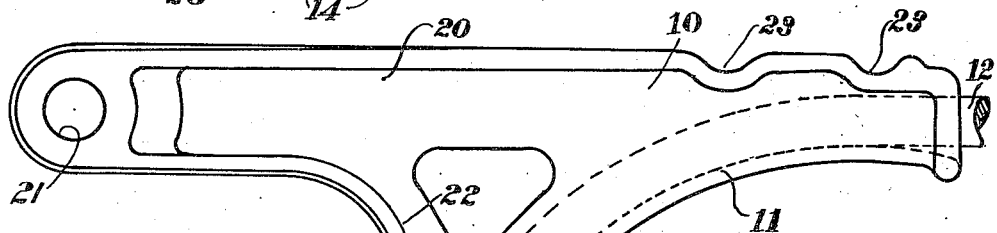
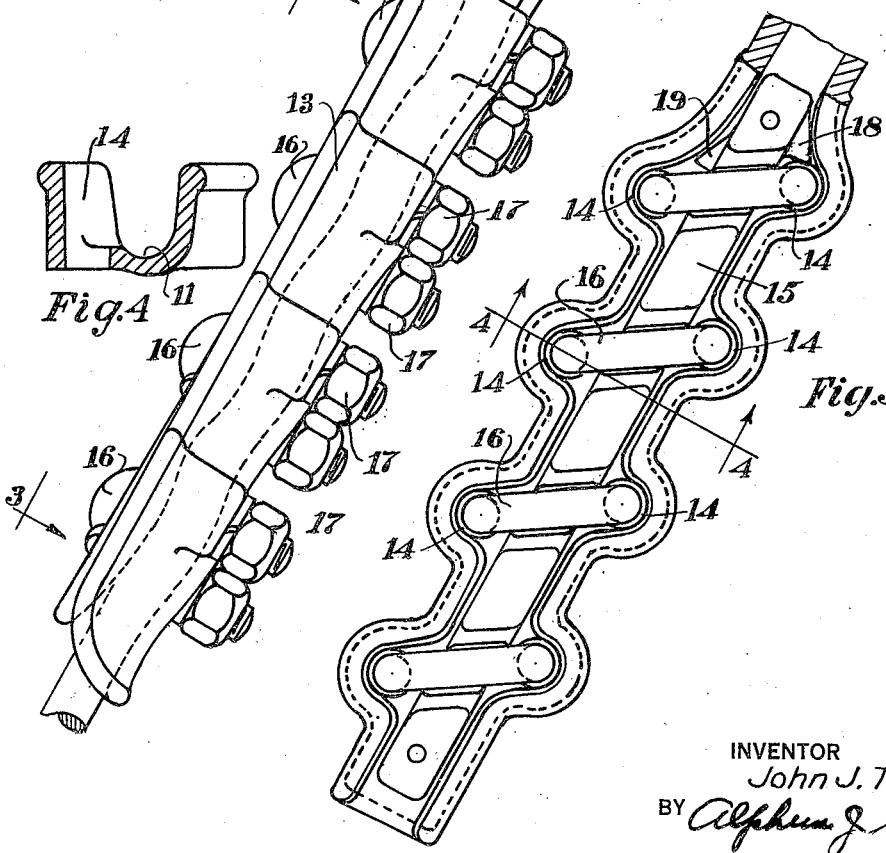
INVENTOR
John J. Taylor
BY *Alpheus J. Crank*
ATTORNEY Patented Nov. 17, 1936

2,061,371

UNITED STATES PATENT OFFICE 2,061,371

CLAMP

John J. Taylor, Wadsworth, Ohio, assignor to The Ohio Brass Company, Mansfield, Ohio, a corporation of New Jersey Application September 6, 1935, Serial No. 39,433

8 Claims. (Cl. 24—135)

This invention relates to clamps for securing the ends of electrical conductors or other strands or cables, and has for one of its objects the provision of a cable holding device which will make available the full strength of the cable, which can be easily applied to the cable at a point between the ends thereof, which will be of minimum weight for the load to which it is subjected and in which danger of incorrect assembly of the parts is avoided.

A further object is to provide a clamp, adapted for the application of a device for damping out vibrations of the cable.

A further object is to provide a device of the class named which shall be of improved construction and operation.

Other objects and advantages will appear from the following description.

The invention is exemplified by the combination and arrangement of parts shown in the accompanying drawing and described in the following specification, and it is more particularly pointed out in the appended claims.

In the drawing:

Fig. 1 is a top plan view of a clamp embodying the present invention.

Fig. 2 is a side elevation of the clamp shown in Fig. 1.

Fig. 3 is a view looking in the direction of the arrows 3 in Fig. 2.

Fig. 4 is a section on line 4—4 of Fig. 3.

The clamp comprises a body member 10 which is U-shaped in cross section, forming a seat 11 which is tangent to the cable 12 at the point of entrance of the cable and which curves downwardly with a gradually increasing curvature, as shown in Fig. 2, to an angle of about 60° to the horizontal where it enters a shank portion 13 of the clamp body, which is also U-shaped in cross section and which is provided with inwardly opening pockets 14 at the sides thereof. The bottom of the seat in the holding shank 13 is undulated to facilitate snubbing the cable in the seat, the undulations gradually decreasing in radius of curvature from the top to the bottom portion of the shank. A keeper bar 15 is placed over the cable in the holding shank and is clamped against the upper side of the cable by U-bolts 16, the ends of which are received in the pockets 14 and extend through openings in the bottoms of the pockets and are held in place by nuts 17 threaded onto the projecting ends of the U-bolts. It will be noted that the pockets 14 on one side of the seat are staggered relative to the pockets on the opposite sides for the purpose of displacing the nuts 17 relative to each other to give better clearance for rotating the nuts on the ends of the U-bolts. The offset relation of the pockets 14 also makes possible the use of wider U-bolts, which are more easily bent than would be the case if the legs of the bolts were closer together. The diagonal position of the U-bolts across the keeper bar 15 also gives a better distribution of pressure on the top of the keeper piece. It will be noted that one side wall of each of the pockets 14 is inclined at an oblique angle relative to a plane normal to the axis of the conductor while the other side wall of each pocket is substantially normal to the axis of the conductor. The inclination of one side wall of each pocket is to accommodate the diagonal position of the U-bolt and the other side wall is made substantially normal in order to provide as much lateral support for the cable in the pocket as possible. Both side walls of the endmost pocket at one side of the seat, however, are inclined relative to a plane normal to the conductor in order to impart greater strength to the clamp at the point where the shank joins the main body portion of the clamp. The corresponding pocket at the opposite side of the seat may be shaped like the other pockets on that side because the inclined walls of all the pockets on that side of the clamp are at the sides of the pockets next adjacent the upper portion of the clamp. It will thus be seen that the endmost pocket at the side of the clamp having its pockets closest to the upper portion of the clamp is of a different shape from all of the other pockets and is provided with an open space at one side of the U-bolt, differing from that of any of the other pockets.

Advantage is taken of this open space by providing a triangular projection 18 on the keeper bar 15 which fits into the space in the pocket at the side of the U-bolt. This projection makes it impossible to assemble the clamp with the keeper piece in improper position. If the keeper piece 15 is placed in any other than its proper position, the projection 18 will extend across the opening for the U-bolt and prevent insertion of the U-bolt in the particular pocket in which the keeper piece 18 is located. A projection 19, similar to 18 but smaller, is arranged to enter the endmost pocket at the side of the seat opposite the projection 18 and cooperates with the projection 18 in locating the keeper piece in an endwise direction and in preventing it from being extended too far up into the body of the clamp. It is important that the keeper piece be properly located in its seat in order for the undulations on the lower side of the keeper piece to register with the undulations in the cable seat. Any improper location of the keeper piece not only tends to weaken the grip of the clamp on the cable but also is apt to injure the cable.

The arrangement described takes advantage of a feature, already present in the clamp, for locating the keeper piece without interfering with the easy assembly of the device and thus uses the feature already present for a double purpose. The device is very easily assembled for it is only necessary for the operator to place the keeper piece in position on the cable with the keeper pressed upwardly as far as it will go and then insert the U-bolts in place and tighten the nuts. The cable is very readily placed in position since the seat is open at its top throughout the entire length of the clamp. In order to provide for ready entrance of the cable into the seat, the attachment arms 20 are secured to the side walls of the seat and extend rearwardly in line with the exit portion of the cable, as shown clearly in Fig. 2; the arms being spaced apart, leaving a clear space for the entrance of the cable between the arms as shown in Fig. 1. The arms 20 are formed rigid with the body of the clamp so that there is no tendency for vibration about the point where the arms join the body of the clamp. Any vibration of the clamp produced by the conductor would have to be about the axis of support of the clamp formed by a pin extending through the opening 21. Since this point is removed from the point of attachment of the arms to the body of the clamp, there is much less tendency to vibrate than where the arms are pivotally connected to the clamp body. The pin can be inserted in the opening 21 for attaching the clamp to its support after the cable has been passed between the arms 20 and located in its seat.

The arms 20 may be provided with a brace 22 for strengthening the arms and supporting the clamp where the tension of the cable produces stress in the clamp body. It will be noted that the U-bolts 16 are all located below the point where the brace 22 joins the shank. This greatly facilitates the application of the U-bolts since it provides a clear open space at the points where the U-bolts are inserted. The end of the clamp body is provided with transverse notches 23 to receive clamping bolts for holding a vibration damper in place. One form of vibration damper which may be secured to the end of the clamp body is shown in patent to Arthur O. Austin No. 2,011,138, granted August 13, 1935. The two sets of notches 23 provide a firm attachment for the vibration damper and prevent any danger of slipping of the damper in the direction of the length of the cable. The rigid attachment of the supporting arms to the two walls of the channel shaped body provides a clamp having a minimum of weight for a given strength and one which is well balanced and supported to avoid vibration. It also provides an arrangement in which the cable may be easily placed in the clamp without the necessity of threading it through any form of opening so that the clamp may be applied to the cable although neither end of the cable is accessible.

I claim:

1. A cable clamp comprising a channel shaped body member having a curved seat at the bottom of the channel, supporting arms rigidly secured, one to each of the sides of the channel and extending in a direction tangent to the entrance portion of the seat, means at the ends of said arms away from said seat for pivotally supporting said clamp, said arms being spaced apart, leaving a clear space therebetween for the entrance of a cable into said seat, a holding shank formed rigidly with said body member and supporting arms and having a channel therein forming a continuation of the seat in said body member, bracing means connecting the sides of said shank with said arms respectively, said bracing means being joined to said shank and to said arms near the end of said shank and the ends of said arms closest said body member and at a considerable distance from the other ends of said arms, said shank extending rearwardly from said body member at an acute angle with said arms, a keeper for holding a cable in said shank and bolts for securing said keeper in place, said bolts all being located along said shank rearwardly beyond the rearmost point of connection between said shank and said arms, the portion of said shank rearwardly of said point being substantially straight and having an undulated seat therein and being of sufficient length and having enough bolts thereon to retain the cable in said clamp when the cable is subject to full load.

2. A cable clamp comprising a U-shaped body having a curved seat for a cable, said body having a substantially straight holding shank projecting at an oblique angle, rearwardly therefrom and having an undulated holding surface forming a continuation of said seat, clamping bolts for holding the cable in said shank, a supporting arm extending rearwardly from said body in a direction tangent to the entrance portion of said seat and at an acute angle with said holding shank, said arm being rigidly attached to said body and connected with said shank and extending rearwardly for a major portion of its length beyond its rearmost point of connection with said shank, all of said clamping bolts being located along said shank beyond the outermost point of connection between said arm and said shank, there being enough bolts so located to hold the cable in place in said clamp under full load on said cable.

3. A cable clamp comprising a channel shaped body having a curved seat for a cable at the bottom of the channel formed by said body, a clamping shank extending at an oblique angle, rearwardly from said body and forming a continuation of said seat, spaced arms extending from the sides of said body and formed integral therewith, the angle between said arms and said shank being less than 90°, a brace between each of said arms and said shank, the major portions of said arms and shank being disposed beyond said braces away from said body and a sufficient number of clamping bolts for holding a cable in said shank at full load being located along said shank beyond the point of attachment of said braces with said shank.

4. A clamp for a cable comprising a channel member having a seat at the bottom thereof and having pockets at opposite sides thereof, a keeper piece for holding a cable on said seat, U-bolts for clamping said keeper piece against said cable, the legs of said U-bolts extending respectively into said pockets at opposite sides of said seat, one of said pockets differing in shape from the other pockets and providing an open space at one side of said keeper piece differing from the spaces in the other pockets at the sides of said keeper piece, and a projection on said keeper piece extending into said differing open space, to locate said keeper piece in proper position relative to said seat.

5. A cable clamp comprising a channel shaped member having a seat therein and having pockets at opposite sides thereof, the pockets at one side of said member being offset relative to the pockets at the other side, a keeper piece for holding a cable on said seat in said member, U-bolts for holding said keeper piece, said U-bolts each having the legs thereof extending respectively into pockets at opposite sides of said seat, each of said pockets having one side wall thereof inclined to accommodate a diagonally extending U-bolt, one of said pockets having the other side thereof also inclined to provide a space at one side of the U-bolt in said pocket differing from the spaces in all the other pockets, and a projection on said keeper piece extending into said differing space to facilitate proper location of said keeper piece relative to said seat.

6. A cable clamp comprising a member having an undulated seat therein, the undulations of said seat gradually decreasing in radius of curvature from one end of said seat toward the other, a keeper piece for holding a cable on said seat, said keeper piece having undulations shaped to conform to the undulations of said seat when said keeper piece is properly assembled on said seat, and means for preventing assembly of said keeper piece in an improper position on said seat.

7. A cable clamp comprising a member having an undulated seat therein, the undulations of said seat gradually decreasing in radius of curvature from one end of said seat toward the other, a keeper piece for holding a cable on said seat, said keeper piece having undulations shaped to conform to the undulations of said seat when said keeper piece is properly assembled on said seat, and a recess and projection on said parts respectively arranged to register when said keeper piece is properly assembled on said seat but arranged to prevent assembly of said keeper piece on said seat in improper position.

8. A clamp for a cable comprising a channel member having a seat at the bottom thereof and having pockets at opposite sides thereof, said seat having undulations therein gradually decreasing in radius of curvature from one end of said seat toward the other, a keeper piece for holding a cable on said seat, said keeper piece having undulations shaped to conform to the undulations of said seat when said keeper piece is properly assembled on said seat, U-bolts for clamping said keeper piece against said cable, the legs of said U-bolts extending respectively into said pockets at opposite sides of said seat, one of said pockets differing in shape from the other pockets and providing an open space on one side of said keeper piece differing from the spaces in the other pockets at the sides of said keeper piece, and a projection on said keeper piece extending into said differing open space to locate said keeper piece in proper position relative to said seat.

JOHN J. TAYLOR.